United States Patent
Lu et al.

(10) Patent No.: US 8,973,709 B2
(45) Date of Patent: Mar. 10, 2015

(54) BRAKE MODULE AND LIFT HAVING THE SAME

(75) Inventors: Der-Wei Lu, New Taipei (TW); Chung-Cheng Hu, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 252 days.

(21) Appl. No.: 13/587,882

(22) Filed: Aug. 16, 2012

(65) Prior Publication Data

US 2013/0306406 A1 Nov. 21, 2013

(30) Foreign Application Priority Data

May 21, 2012 (TW) .............................. 101209549 U (51) Int. Cl.
*E04G 1/18* (2006.01)
*B61H 7/12* (2006.01)

(52) U.S. Cl.
USPC ....................................................... 182/141

(58) Field of Classification Search
CPC ....................................................... B61H 7/12
USPC ....................................................... 182/141
See application file for complete search history.

(56) References Cited

U.S. PATENT DOCUMENTS

| 5,524,869 A * | 6/1996 | Asplin ................. 254/134.3 CL |
| 6,336,528 B1 * | 1/2002 | Rudy ............................. 188/43 |
| 7,029,214 B2 * | 4/2006 | Shiba et al. ................. 409/241 |
| 2004/0099492 A1 * | 5/2004 | Onuki et al. ................. 188/163 |

* cited by examiner

*Primary Examiner* — Alvin Chin-Shue (74) *Attorney, Agent, or Firm* — Li & Cai Intellectual Property (USA) Office (57) ABSTRACT

A lift includes a mast and a brake module. The mast is for disposing on a working surface and has at least one track. The brake module is connected to a lift module mounted on the mast and includes at least one friction member and at least one forcing member. The friction member has a pressing portion and an axle oppositely arranged. The pressing portion is substantially shaped to engage the track. The forcing member is rotatably disposed on the axle for pivoting axially between a first position and a second position. At the first position, the pressing portion can be moved along the track and stopped by the lift module. At the second position, the forcing member displaces the friction member to force the pressing portion tightly against the track. Thus, the brake module is held in position relative to the mast.

5 Claims, 7 Drawing Sheets

BRAKE MODULE AND LIFT HAVING THE SAME

BACKGROUND OF THE INVENTION

1. Field of the Invention

The instant disclosure relates to a brake module and a lift having the same; more particularly, to a brake module and a lift having the same that utilize friction means to carry out braking operation.

2. Description of Related Art

In general, existing braking mechanisms operative on support frames are hydraulic or cable operated. Both types of brake system are simple to operate but have some disadvantages. Namely, slack or loose cable can cause a slow response time for the actuation of the brake control mechanism. Whereas hydraulic brakes occupy significant space and have a higher manufacturing cost.

SUMMARY OF THE INVENTION

The object of the instant disclosure is to provide a brake module and a lift having the same that utilize friction means to carry out braking operation.

The lift comprises a mast, a brake module, and a lift module. The mast is disposed on a working surface and defines a longitudinal direction. At least one track is formed on an outer surface of the mast along the longitudinal direction. The track has a tapered cross-section perpendicular to the longitudinal direction. The brake module includes at least one friction member and at least one forcing member. The friction member has a pressing portion proximate to the mast and an axle extending away from the mast. The pressing portion is substantially shaped to engage matchingly with the track. The axle is substantially perpendicular to the longitudinal direction. The forcing member rotatably fits over the axle, where the friction member is selectively displaced by the forcing member. The forcing member is pivotable about the axle between a first position and a second position. The lift module is mounted on the mast and connected to the brake module. When the forcing member is at the first position, a clearance is created between the pressing portion of the friction member and the track. Thus, the friction member may slide on the track and stop at any position on the mast through the lift module. When the forcing member is at the second position, the forcing member forces the pressing portion of the friction member to press tightly against the track. Thus, the brake module is held in position relative to the mast.

Preferably, the track has a pair of bearing faces, and the pressing portion has a pair of pressing faces. When the forcing member is at the second position, the pressing faces of the pressing portion are pressed tightly against the bearing faces of the track.

Preferably, the track has a center face connected between the bearing faces. The pressing portion has a foot face connected between the pressing faces. When the forcing member is at the second position, a predetermined clearance is maintained between the center face and the foot face.

Preferably, the friction member has a first projection, and the forcing member has a main body. When the forcing member is turned from the first to second position, the first projection is urged by the main body in displacing the friction member toward the mast along the longitudinal direction of the axle.

Preferably, the friction member has a first projection, and the forcing member has a main body. When the forcing member is turned from the first to second position, the first projection is urged by the main body in displacing the friction member toward the mast along the longitudinal direction of the axle.

Preferably, the first projection has at least one head, and the main body is formed with at least one groove. When the forcing member is at the first position, the head is received by the groove. When the forcing member is at the second position, the head is abutted by an inner face of the main body.

Preferably, the friction member has a base portion. The pressing portion extends from one side of the base portion proximate to the mast. Whereas the axle and the first projection extend from an opposite side of the base portion away from the mast.

Preferably, the direction in which the forcing member rotates from the first to second position is defined as the first rotating direction. The thickness of the head increases progressively from the base portion along the first rotating direction in defining a first sloped face.

Preferably, the groove is formed matchingly to receive the head, and the groove is defined by a second sloped face. The second sloped face mates to the first sloped face.

Preferably, the brake module includes a housing unit and a connector. The forcing member is received by the housing unit, while the housing unit is fixed to the connector. The connector is connected to the lift module.

Preferably, the housing unit has at least one housing for accommodating the forcing member. The forcing member is pivotable about the longitudinal axis of the axle.

Preferably, the housing includes at least one internal annular ridge. At least one annular slot is formed matchingly on the outer surface of the forcing member for receiving the ridge.

Preferably, the lift further includes an operating module mounted on the forcing member. The operating module allows a user to manually rotate the forcing member.

The forcing member has a connecting portion. The operating module includes at least one coupler and a lever. The coupler is mounted on the connecting portion, and the lever is mounted on the coupler and substantially above the forcing member.

The instant disclosure also provides a brake module mounted on opposite tracks of a mast. The brake module is connected to a lift module mounted on the mast. The brake module comprises a pair of friction members and a pair of forcing members. Each friction member has a pressing portion and an axle. The pressing portions are arranged proximate to the tracks. Whereas the axles are extended away from the tracks. The pressing portion is substantially shaped for engaging the track. The forcing members are rotatably fitted over the axles of the friction members. The forcing members can displace the friction members. The forcing members can rotate axially about the axles between a first position and a second position. When the forcing members are arranged at the first position, a clearance is created between the pressing portions and the tracks. The pressing portions of the friction members can move on the tracks and stop at any location on the mast through the lift module. When the forcing members are arranged at the second position, the friction members are displaced by the forcing members. The pressing portions of the friction members are pressed tightly against the tracks. The brake module is thus held in position relative to the tracks.

Preferably, each track has a pair of bearing faces, and each pressing portion has a pair of pressing faces. When the forcing members are arranged at the second position, the pressing faces of the pressing portions are pressed tightly against the bearing faces of the tracks.

Preferably, each track has a center face connected between the bearing faces. Each pressing portion has a foot face connected between the pressing faces. When the forcing members are arranged at the second position, a predetermined clearance is maintained between the center faces of the tracks and the foot faces of the pressing portions.

Preferably, each friction member has a first projection, and each forcing member has a main body. When the forcing members are rotating from the first position to the second position, the main bodies press against the first projections to move the friction members toward the tracks along the longitudinal direction of the axles.

Preferably, each first projection has at least one head, and at least one groove is formed on an inner face of each main body. When the forcing members are arranged at the first position, the heads are received by the grooves of the main bodies. When the forcing members are arranged at the second position, the heads are abutted by the inner faces of the main bodies.

Preferably, each friction member has a base portion. The pressing portion of each friction member extends from one side of the base portion proximate to the mast. The axle and first projection of each friction member extend from an opposite side of the base portion away from the mast. The rotating direction of the forcing members from the first position to the second direction is defined as a first rotating direction. The thickness of each head increases progressively from the base portion along the first rotating direction to define a first sloped face.

Preferably, the grooves of the main bodies are shaped matchingly to receive the heads of the first projections. Each groove is defined by a second sloped face that can mate to the first sloped face.

Based on the foregoing, the brake module and the lift having the same of the instant disclosure utilize the forcing members to squeeze the friction members against the tracks in achieve braking effect.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF EMBODIMENTS

Figure 1:
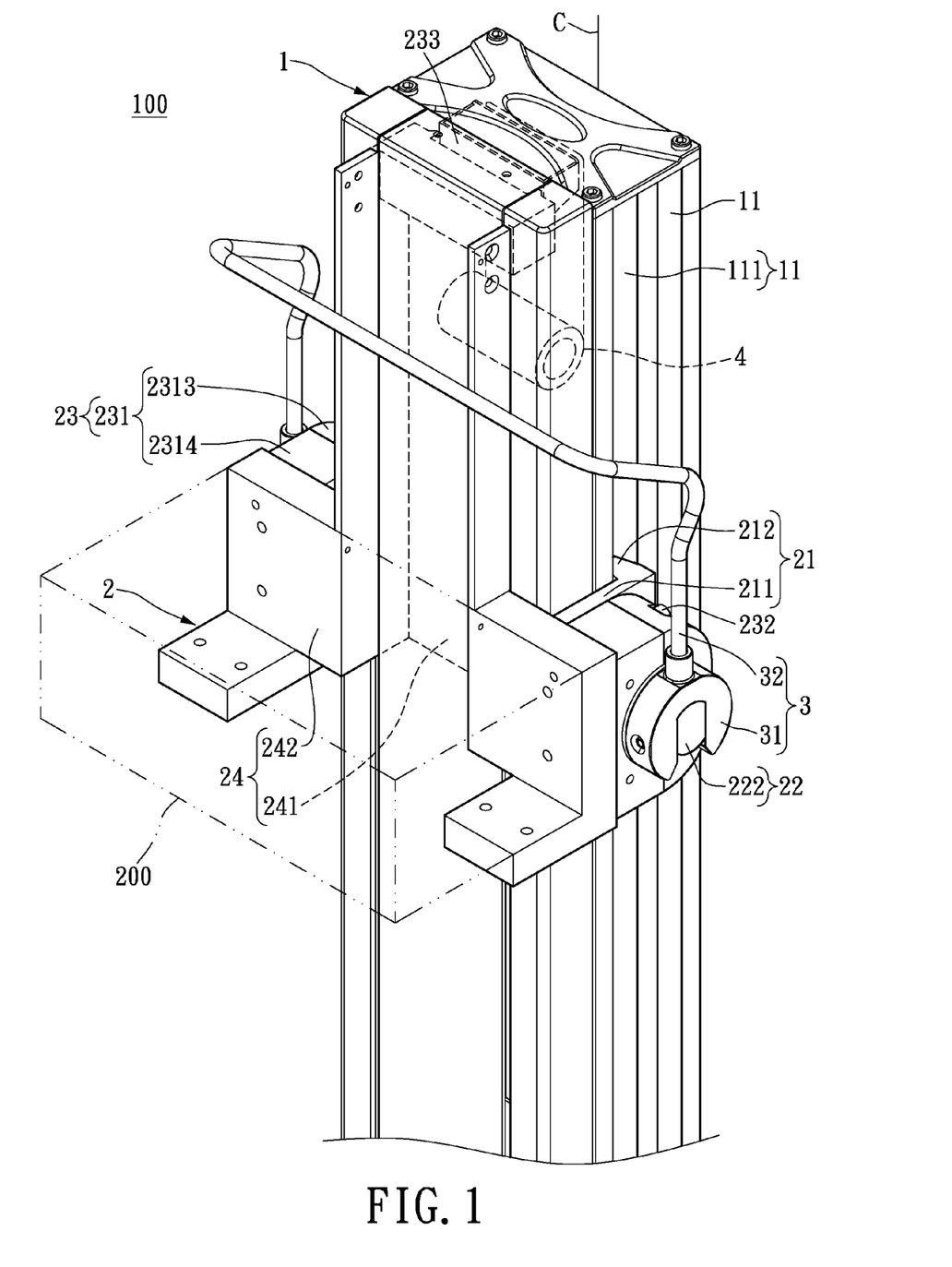
FIG. 1 is a perspective view showing a brake module of the instant disclosure movable along the mast.

Please refer to FIG. 1. The instant disclosure provides a lift 100, which comprises a mast 1, a brake module 2, an operating module 3, and a lift module 4. The mast 1 is disposed on a working surface (e.g., a ground surface or a base of a cart). The lift module 4 may be constructed of a constant-force spring but is not restricted thereto.

After the brake module 2 has been mounted on the mast 1, the brake module 2 may be configured at a locked state and an unlocked state by the operating module 3. The unlocked state is first described herein below.

Figure 4:
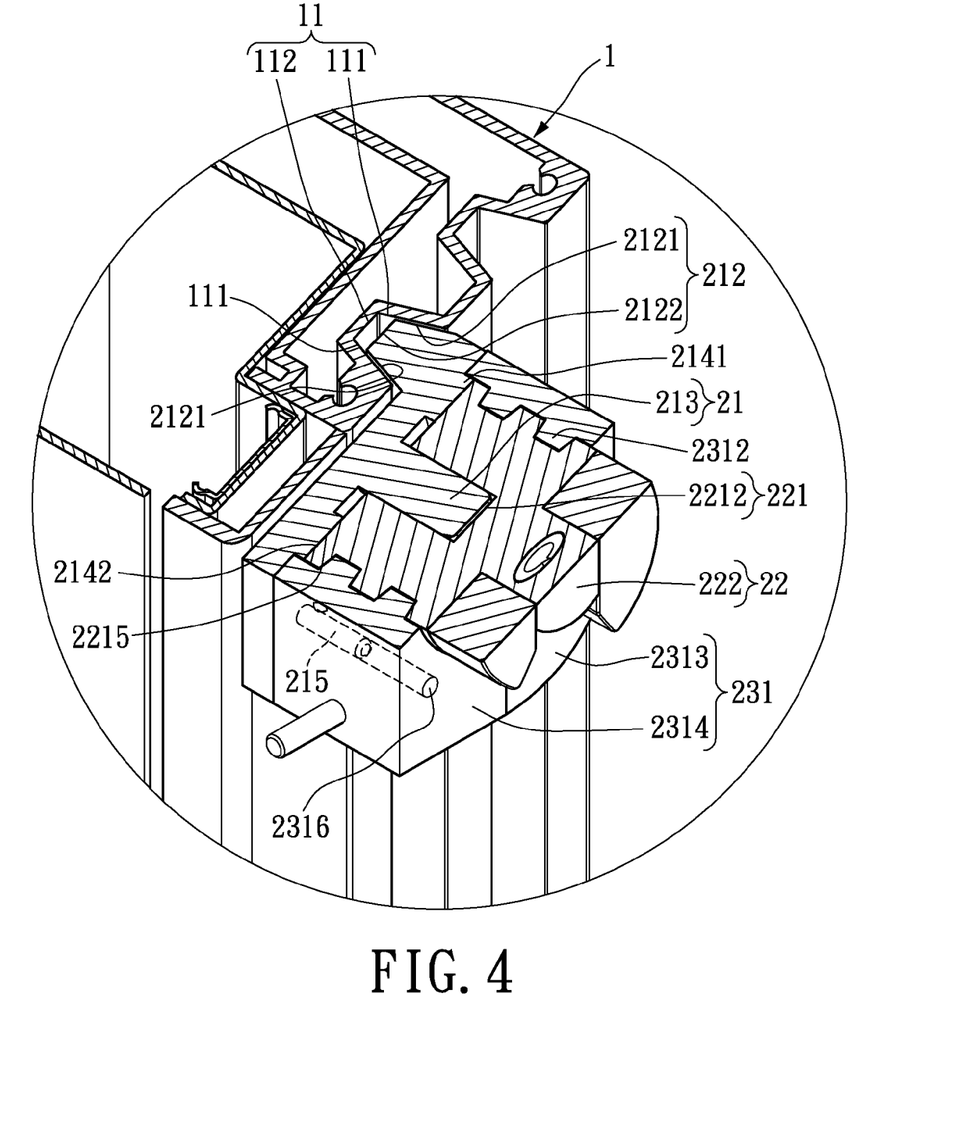
FIG. 4 is a partial cross-sectional view of FIG. 1

Please also refer to FIG. 4 in conjunction with FIG. 1. The mast 1 defines a longitudinal direction C. A pair of tracks 11 is formed on opposite sides (right- and left-hand sides) of the mast 1 along the longitudinal direction C. Each track 11 defines a longitudinal slot that is substantially trapezoid-shaped in cross-section perpendicular to the longitudinal direction C. The trapezoid-shaped cross section tapers inwardly.

More specifically, each track 11 has a pair of bearing faces 111 and a center face 112. The bearing faces 111 are held facing each other. The separation distance between the bearing faces 111 decreases progressively inward toward the center face 112 (i.e., from the right-hand side toward the left-hand side in FIG. 4). The center face 112 is connected between the bearing faces 111 and spans across the smallest separation distance.

The brake module 2 includes a pair of friction members 21, a pair of forcing members 22 working cooperatively with the friction members 21, a housing unit 23 for the forcing members 22, and a connector 24 for the housing unit 23.

Being substantially plate-shaped, the connector 24 has a connecting portion 241 and a pair of fixing portions 242. The fixing portions 242 extend from opposite sides of the connecting portion 241. Each fixing portion 242 is formed with a pair of fixing holes 2421.

The connector 24 is disposed on one side of the mast 1 (i.e., the left-hand side in FIG. 1). More specifically, the connecting portion 241 of the connector 24 is arranged between a stop plate 233 and the mast 1.

In addition, the fixing portions 242 of the connector 24 may support a work platform 200. The connecting portion 241 is connected to the lift module 4. The lift module 4 operates cooperatively with the brake module 2 such that the work platform 200 may be stopped at any position along the mast 1.

For the illustrated embodiment, the friction member-forcing member assemblies come in a pair. Since both assemblies have same structural features and functional characteristics, the description herein below is made for one friction member 21 and one forcing member 22.

Figure 2:
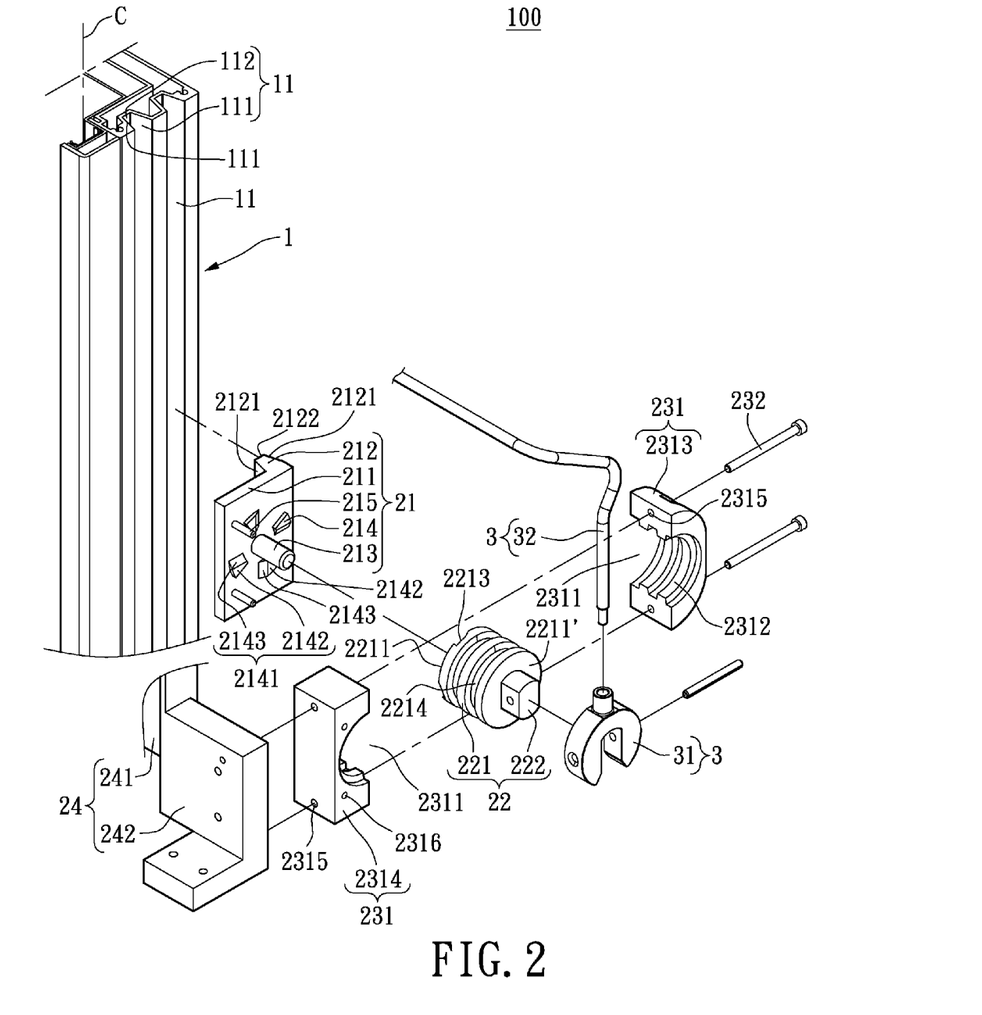
FIG. 2 is an exploded view of FIG. 1.
Figure 3:
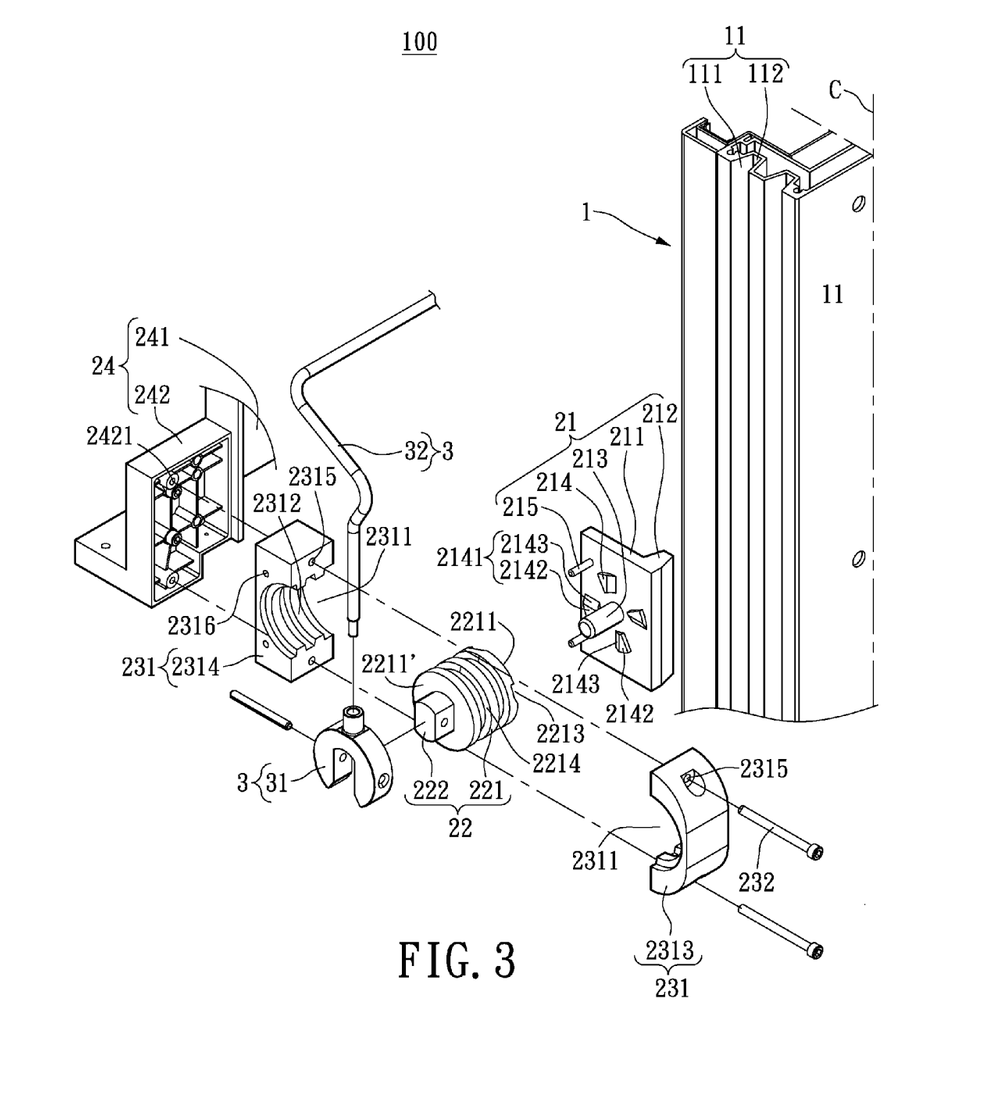
FIG. 3 is another exploded view of FIG. 1.

Please refer to FIGS. 2 and 3. For ease of explanation, the stop plate 233 is not shown in both figures. The friction member 21 has a base portion 211, a pressing portion 212, an axle 213, a first projection 214, and a pair of studs 215. The base portion 211 is flat. The pressing portion 212 protrudes from one side of the base portion 211 proximate to the mast 1. The axle 213, the first projection 214, and the studs 215 are disposed on opposite side of the base portion 211 away from the mast 1.

The cross-section of the pressing portion 212 is substantially trapezoid shaped, for the pressing portion 212 to fit matchingly in the track 11. In other words, the pressing portion 212 has a pair of pressing faces 2121 and a foot face 2122. The pressing faces 2121 are held facing away from each other, and the separation distance between decreases progressively away from the base portion 211 (i.e., from the right-hand side to the left-hand side in FIG. 2). The foot face 2122 is connected between the pressing faces 2121 and spans across the smallest separation distance.

The axle 213 and the studs 215 are substantially cylindrical and arranged substantially perpendicular to the longitudinal direction C. The first projection 214 includes four heads 2141. The heads 2141 are arranged symmetrically and separately about the axle 213.

Each head 2141 has an abutting face 2142 and a first sloped face 2143. The first sloped faces 2143 are held on the same side of the heads 2141. The first sloped face 2143 extends along a first rotating direction (i.e., the counter-clockwise direction with respect to the longitudinal axis of the axle 213) to the abutting face 2142. In other words, when traveling along the first rotating direction, the first sloped face 2143 is first met followed by the abutting face 2142. Furthermore, the thickness perpendicular to the longitudinal direction C of each head 2141 increases progressively from the first sloped face 2143 away from the base portion 211.

Figure 2A:
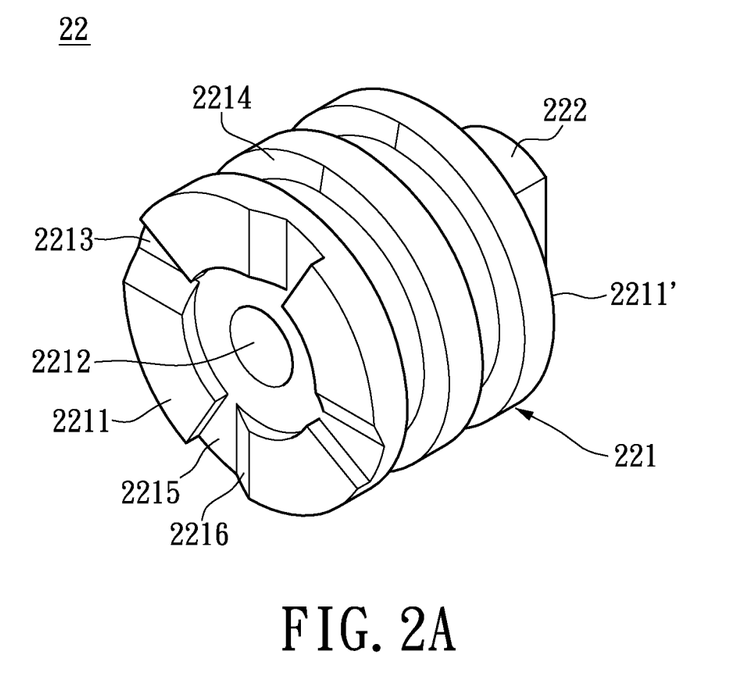
FIG. 2A is a perspective view showing the forcing member.

Please refer to FIG. 2A. The forcing member 22 has a main body 221 and a column-shaped connecting portion 222. The main body 221 is substantially cylinder-shaped. The main body 211 has an inner face 2211 formed with a circular hole 2212 and four grooves 2213. The connecting portion 222 is formed on an outer face 2211' of the main body 211. The connecting portion 222 is of ellipse-like configuration having opposed substantially straight sides and rounded ends. The round surface of the main body 221 between the inner and outer faces 2211, 2211' is formed with a pair of annular slots 2214.

Specifically, the hole 2212 is substantially shaped to matchingly receive the axle 213. The hole 2212 is formed centrally on the main body 221 and its depth is slightly greater than the length of the axle 213.

The grooves 2213 are substantially shaped to matchingly receive the heads 2141. Specifically, each groove 2213 is defined by a bottom face 2215 and a second sloped face 2216 (as shown in FIG. 2A). In particular, the bottom face 2215 and the second sloped face 2216 are shaped matchingly to mate with the abutting face 2142 and the first sloped face 2143, respectively, of the head 2141.

The housing unit 23 includes a pair of housings 231, a connector 24, four screws 232, and a stop plate 233 (as shown in FIG. 1). Each housing 231 is constructed of a first half-piece 2313 and a second half-piece 2314 interconnected to each other, but is not restricted thereto. Each housing 231 is formed with an internal storage compartment 2311 for receiving the main body 221 of the forcing member 22. Specifically, the first and second half-pieces 2313, 2314 are substantially horseshoe shaped. Each housing 231 has a pair of internal annular ridges 2312 for receiving by the slots 2214 of the forcing member 22.

For the first and second half-pieces 2313, 2314, each is formed with a threaded thru holes 2315. The second half-piece 1214 is further formed with a pair of guide holes 2316 for receiving the studs 215.

Please refer to FIGS. 2 and 4. The pressing portion 212 of the friction member 21 is slidably engaged to the track 11 of the mast 1. The pressing faces 2121 of each friction member 21 are adjacent to the bearing faces 111 of the track 11. The foot face 2122 is held facing the center face 112.

The main body 221 of the forcing member 22 rotatably rides over the axle 213 of the friction member 21 through the hole 2212. The heads 2141 are received by the grooves 2213. The second sloped faces 2216 of the forcing member 22 are substantially mated to the first sloped faces 2143 of the friction member 21. The bottom face 2215 is substantially abutted by the abutting face 2142.

The main body 221 of the forcing member 22 is received inside the housing 231. Specifically, the main body 221 is received in the storage compartment 2311 of the housing 231. The ridges 2312 are arranged inside the slots 2214 to provide better stability while the forcing member 22 is rotating. The guide holes 2316 of the of the second half-piece 2314 ride over the studs 215 of the friction member 21.

Please refer to FIGS. 1 and 3. Screws 232 extend through the thru holes 2315 of the housing 231 such that the housing 231 is secured to the fixing portion 242 through the fixing hole 2421.

The connector 24 allows the housing 231 and the forcing member 22 to maintain a proper distance from the mast 1. With the heads 2141 received by the grooves 2213, a clearance is created between the base portion 211 of the friction member 21 and the mast 1 and between the pressing portion 212 and the track 11 (as shown in FIG. 4). During such state, the brake module 2 is held suspendingly by the lift module 4 and is movable along the mast 1.

The operating module 3 includes a pair of couplers 31 connected by a lever 32. The couplers 31 are substantially U-shaped to matchingly receive the connecting portions 222. The lever 32 is also substantially U-shaped. The opposite ends of the lever 32 are substantially parallel to the direction of the longitudinal direction C and mounted to the upper portions of the couplers 31.

The user may operate the lever 32 such that the force is transmitted to the main bodies 221 through the couplers 31 and the connecting portions 222. The applied force urges the main bodies 221 of the forcing members 22 to rotate selectively between a first position (as shown in FIG. 1) and a second position (as shown in FIG. 5).

As shown in FIG. 1, when the main bodies 221 of the forcing members 22 are arranged at the first position, the brake module 2 is in the unlocked state. In other words, the pressing portions 212 of the friction members 21 are free to move along the tracks 11.

When the forcing members 22 are being rotated to the second position, the lever 32 is manipulated by the user to rotate along the direction of the first rotating direction. The couplers 31 rotate with the lever 32 and force the forcing members 22 to rotate axially about the axles 213. The first sloped faces 2141 of the friction members 21 are guided by the second sloped faces 2216 of the forcing members 22 such that the friction members 21 are forced to migrate toward the mast 1 along the direction parallel to the longitudinal axes of the axles 213. The displacement of the friction members 21 decreases the clearances between the pressing portions 212 and the tracks 11.

Figure 5:
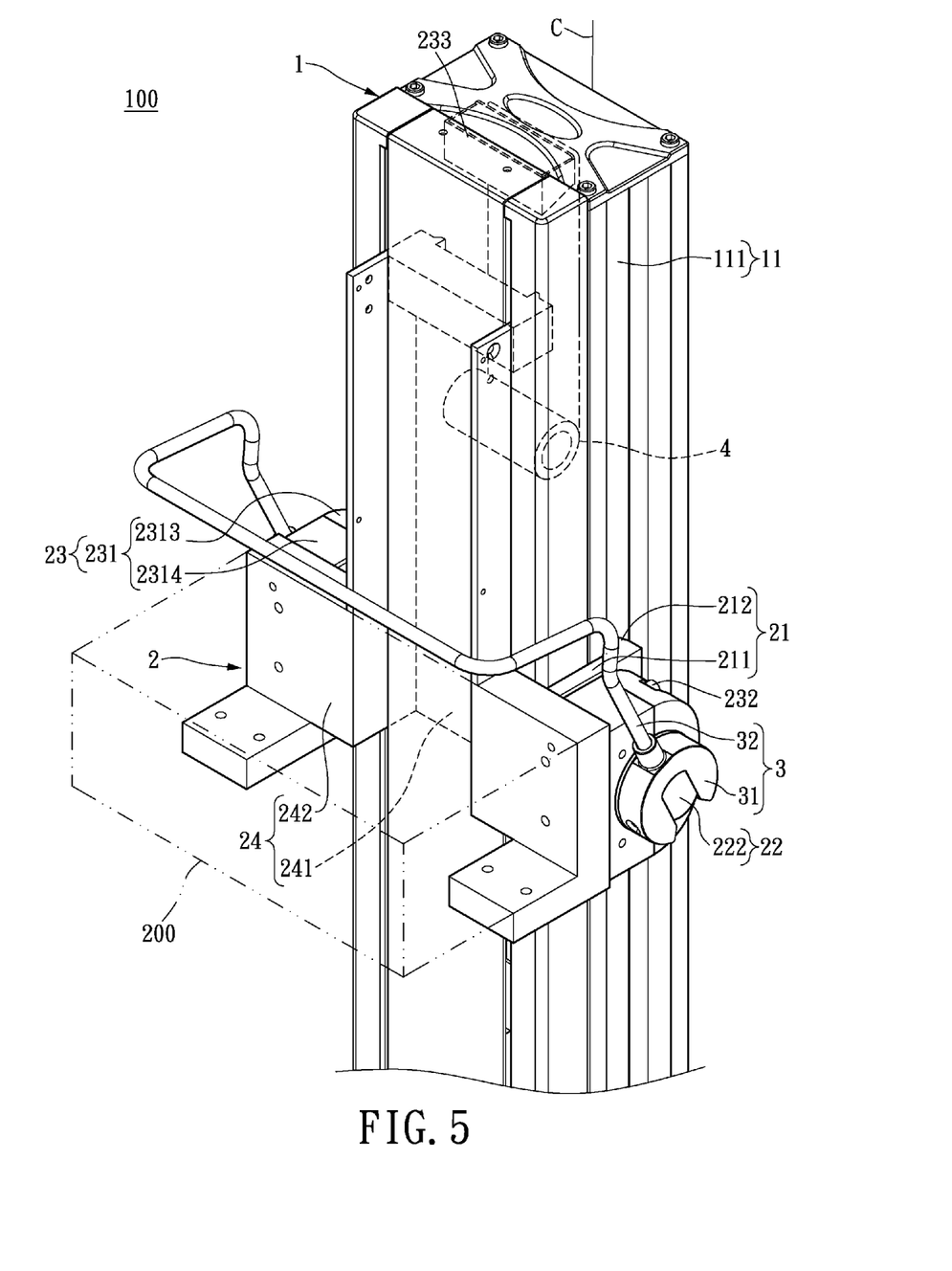
FIG. 5 is a perspective view showing the brake module locked to the mast.
Figure 6:
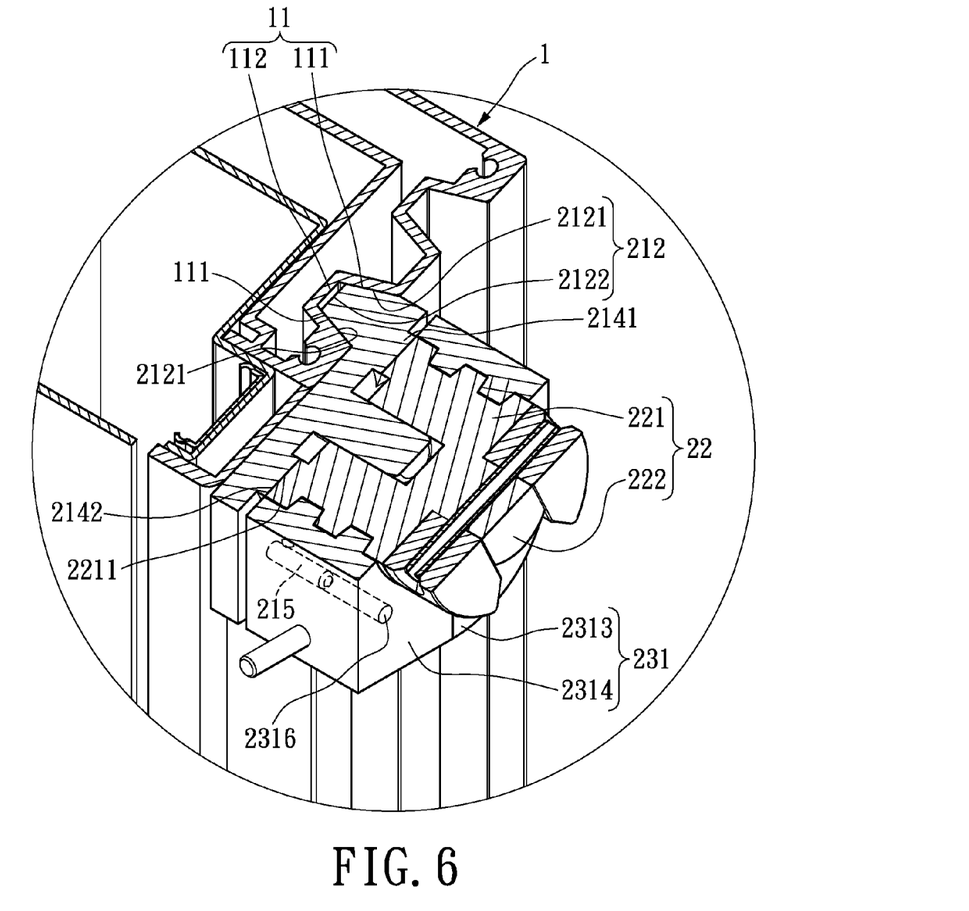
FIG. 6 is a partial cross-sectional view of FIG. 5.

As shown in FIGS. 5 and 6, when the main body 221 of the forcing member 22 is oriented at the second position, the inner face 2211 of the forcing member 22 is held in contact with the abutting faces 2142 of the heads 2141 of the friction member 21. The pressing faces 2121 of the pressing portion 212 press tightly against the bearing faces 111 of the track 11. The brake module 2 can no longer move relative to the mast 1 along the longitudinal direction C. The brake module 2 is effectively in the locked state.

It is worth noting even for the second position, a small clearance still exists between the foot face 2122 of the friction member 21 and the center face 112 of the track 11. The clearance is purposely maintained to compensate any design error that might prevent holding the pressing faces 2121 tightly against the bearing faces 111. In other words, under 100% precision, the foot face 2122 may be designed to abut the center face 112.

When the user intends to change the forcing member 22 from the second position to the first position, the user can pivot the lever 32 along a second rotating direction opposite of the first rotating direction.

Based on the foregoing, the lift of the instant disclosure utilizes the rotational movement of the forcing members to engage the friction members on the tracks in achieving braking effect.

Also, as previously mentioned, when the friction members are held tightly against the tracks, the clearance between the foot faces of the friction members and the center faces of the tracks serves to compensate any design error that might prevent holding the pressing faces tightly against the bearing faces.

The descriptions illustrated supra set forth simply the preferred embodiment of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A brake module, for disposing on a pair of opposite tracks of a mast and connected to a lift module mounted on the mast, comprising:
   a pair of friction members, each friction member having a pressing portion, an axle, and a first projection, the pressing portions being arranged proximate to the tracks and the axles being arranged away from the tracks when the brake module is disposed on the tracks, the pressing portion of each friction member being shaped for matchingly engaging the track; and
   a pair of forcing members rotatably fitted on the axles of the friction members, each forcing member having a main body, the friction members being selectively actuated by the forcing members, the forcing members being pivotal between a first position and a second position about the axles,
   wherein when the forcing members are at the first position, a clearance is left between the pressing portions of the friction members and the tracks, so the pressing portions can move along the tracks relative to the mast, while the pressing portions may stop at any location on the mast by cooperating with the lift module, and wherein when the forcing members are at the second position, the friction members are displaced by the forcing members making the pressing portions to press tightly against the tracks, while holding the brake module in position relative to the tracks,
   wherein when the forcing members are pivoting from the first position to the second position, the main bodies urge the first projections that force the friction members to displace toward the tracks along a longitudinal axis defined by the axles,
   wherein the first projection has at least one head, each main body has an inner face concavely formed with at least one groove, wherein when the forcing members are oriented at the first position, the heads are received by the grooves, and wherein when the forcing members are oriented at the second position, the heads are abutted by the inner faces of the main bodies.

2. The brake module of claim 1, wherein each track has a pair of bearing faces, wherein each pressing portion has a pair of pressing faces, and wherein when the forcing members are oriented at the second position, the pressing faces of the pressing portions are held tightly against the bearing faces of the tracks.

3. The brake module of claim 2, wherein each track has a center face connected between the bearing faces, wherein each pressing portion has a foot face connected between the pressing faces, and wherein when the forcing members are oriented at the second position, a clearance is left between the center faces of the tracks and the foot faces of the pressing portions.

4. The brake module of claim 1, wherein each friction member has a base portion, wherein the pressing portion of each friction member is extended from one side of the base portion, wherein the axle and the first projection of each friction member are extended from an opposite side of the base portion, wherein the pivoting direction of the forcing members from the first position to the second position is defined as a first rotating direction, wherein each head has a first sloped face, and the thickness of each head increases gradually in the direction of the first rotating direction from the first sloped face proximate to the base portion.

5. The brake module of claim 4, wherein the grooves of the main bodies are shaped to receive the heads matchingly, and each groove is defined by a second sloped face that mates the first sloped face.

* * * * *